United States Patent Office 3,358,013
Patented Dec. 12, 1967

3,358,013
α - DIFLUORAMINO - α - ALKOXYMALONATES AND α - DIFLUORAMINOALKANOLS AND THEIR PREPARATION
Jeremiah P. Freeman and William H. Graham, Huntsville, Ala., assignors to Rohm & Haas Company, Philadelphia, Pa., a corporation of Delaware
No Drawing. Filed Mar. 13, 1961, Ser. No. 95,434
11 Claims. (Cl. 260—482)

This invention concerns monohydric alcohols which contain a difluoramino group. More specifically, it concerns the alcohols prepared by the reaction of difluoramine and aldehydes and ketones.

The carbinols of the present invention have the following formula,

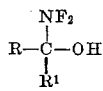

in which R is H or lower alkyl containing 1 to 4 carbon atoms and $R^1$ is H, lower alkyl containing 1 to 4 carbon atoms, or of the formula

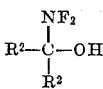

in which $R^2$ is $COOCH_3$ or $COOC_2H_5$, or of the formula

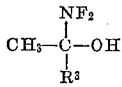

in which $R^3$ is hydroxyalkyl containing 2 carbon atoms.

The carbinols of the present invention are prepared by reacting $HNF_2$ with carbonyl-containing compounds of the formulas:

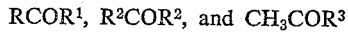

$RCOR^1$, $R^2COR^2$, and $CH_3COR^3$ in which R, $R^1$, $R^2$ and $R^3$ are as hereinbefore described.

The carbinols of the present invention are valuable as intermediates for introducing $NF_2$ groups into polymerizable monomers. These polymerizable monomers are carbamates, acrylates, and methacrylates which contain double bonds and which also contain the $NF_2$ group. Such polymerizable monomers can be prepared from the carbinols of the present invention by well-known methods. Thus the reaction of these carbinols with acrylol or methacrylol chlorides produces the corresponding acrylates and methacrylates. Reactions of these carbinols with unsaturated isocyanates produces the corresponding polymerizable carbamates.

As is well-known, these polymerizable monomers can be homopolymerized to form tough flexible polymers or they may be copolymerized with a variety of other polymerizable monomers to make copolymers which are suitable for coatings, caulking compounds or pressure sensitive adhesives.

The production of $HNF_2$ by the passage of $NF_3$ saturated with water vapor over a heated bed of arsenic is set forth by Kennedy and Colburn, J.A.C.S., 81, 2906 (1959), and this information is included herein by reference. $HNF_2$ can also be produced by the fluorination of urea and subsequent decomposition of the intermediate products as set forth by Lawton and Weber in J.A.C.S., 81, 4755 (1959), and the information therein is included herein by reference.

Suitable aldehydes and ketones include formaldehyde, paraformaldehyde, acetaldehyde, butyraldehyde, acetone, dipropylketone, dibutyl ketone, 3-hydroxybutanone-2 and esters of ketomalonic acid.

The molar ratios of the two reactants can be varied widely without departing from the scope of the invention. Thus, the molar ratio of $HNF_2$ to the carbonyl-containing compound may be from 1.5 to 1 to 1 to 1.5, but in the preferred embodiment, the ratio is 1 to 1.

The temperature of reaction will vary widely depending on the particular carbonyl-containing compound being used. The reaction temperature will vary from 0° C. to 150° C. with the preferred range 25° C. to 150° C.

The reactions should be carried out in an inert atmosphere under anhydrous conditions. The inert atmosphere can be a gas such as nitrogen, helium or argon.

The following examples set forth certain well-defined embodiments of the application of this invention. They are not, however, to be considered as limitations thereof, since many modifications may be made without departing from the spirit and scope of this invention.

Unless otherwise specified, all parts are parts by weight. All temperatures are centigrade unless otherwise noted.

EXAMPLE I

*Diethyl α-difluoramino-α-methoxymalonate*

A 1–2 g. sample of diethylketomalonate was placed in a small test tube attached to a U-tube containing a magnetic stirrer and about three-quarters of the sample was transferred to the U-tube under vacuum. $HNF_2$ was expanded over the sample from an adjoining U-tube. There was an immediate uptake of $HNF_2$ resulting in a pressure drop to about one-half the value previously measured in the empty apparatus. Thereafter further decrease in pressure was slow and probably proportional to the total pressure. In this experiment $HNF_2$ was added to the reaction mixture in successive portions. The first portion was absorbed from 533 to 138 mm. total pressure overnight at room temperature. The residual gas was removed and analyzed to determine whether appreciable $N_2F_4$ formation had occurred before the second portion of $HNF_2$ was added. The second portion was absorbed from 541 to 451 mm. overnight at room temperature. The residual gas was again removed and analyzed before a third portion was added. The third portion was absorbed from 600 to 500 mm. overnight and was accompanied by disappearance of the last vestige of yellow color from the liquid sample. Each sample of supernatant gas showed slight decomposition to $N_2F_4$ viz., reagent 99% $HNF_2$ went to 83% $HNF_2$ containing 8.6% $N_2F_4$ and 3% each of CF's, $N_2O$ and $N_2$ during the first interval; similar reagent $HNF_2$ went to 95% $HNF_2$ containing 2% $N_2F_4$, etc. during the second interval.

The reaction mixture was cooled to −80° and pumped on to remove all unassociated gases; the liquid remained colorless.

The production from the above reaction was cooled to −80° under vacuum while a solution of diazomethane in ether (dried over KOH pellets), which previously had been degassed by pumping on it while cooling in liquid nitrogen, was allowed to condense onto it from an adjoining trap. As rapidly as the ether-diazomethane solution condensed onto the reaction mixture the yellow color was discharged and the pressure over the mixture rose. When the pressure increase effectively blocked the transfer of diazomethane, the gas over the mixture was sampled and found to contain only ether, diazomethane, and nitrogen. The reaction mixture was flushed with nitrogen, cooled to −80°, and enough diazomethane-ether solution was added dropwise at atmospheric pressure to give a persistent yellow color. Excess diazomethane was allowed to evaporate at room temperature into the hood. Excess solvent was then removed and the colorless residual liquid was distilled conventionally. The product distilled at 56°/0.03–0.12 mm.; decomposition was indicated by pressure increase.

The infrared spectrum of the distilled product was identical with that of undistilled material. It featured a strong ester carbonyl band centered at 1770 cm.$^{-1}$ (vs. 1752 cm.$^{-1}$ in diethylketomalonate) and lacked the ketone band at 1839 cm.$^{-1}$. There was a pip at 3500 cm.$^{-1}$ which may have indicated a trace of OH, also visible in distilled ketoester.

The N.M.R. F$^{19}$ spectrum of the product showed a sharp, clean singlet at —4110 cps. (low field from external trifluoroacetic acid).

Elementary analysis confirmed the identity of the product as α-difluoramino-α-methoxymalonic ester.

*Analysis.*—Calc'd for $C_8H_{13}O_5NF_2$: C, 39.84; H, 5.43; N, 5.81. Found: C, 41.43; H, 5.65; N, 5.10.

The product was observed to be a pleasant smelling, colorless, slightly viscous liquid, insoluble in water and subject to very slow hydrolysis. It was sluggish toward iodide ion in acetone solution, requiring several hours before iodine coloration was visible.

EXAMPLE II

*α-Difluoraminomethanol*

A mixture of 0.12 g. (0.003 mole) of paraformaldehyde and 90 cc. (0.004 mole) of difluoramine were heated in a glass bulb at 155° for two hours. Gaseous products were removed and the liquid product, 0.25 g., was shown to be α-difluoraminomethanol by infrared, N.M.R. and mass spectrum analysis.

*Analysis.*—Calc'd for $CH_3ONF_2$: C, 14.46; H, 3.63; N, 16.87; F, 45.77. Found: C, 15.35; H, 4.21; N, 17.09; F, 45.8.

EXAMPLE III

*α-Difluoraminoethanol*

A mixture of 525 cc. (0.023 mole) of difluoramine and 500 cc. (0.022 mole) of gaseous acetaldehyde was condensed in a glass bulb to —128° C. and allowed to stand at that temperature for 30 minutes. The residual gases were then removed and the liquid product collected. Infrared and N.M.R. analysis indicated the desired α-difluoraminoethanol was formed.

*Analysis.*—Calc'd for $C_2H_5ONF_2$: C, 16.86; H, 3.54; N, 9.84; F, 26.68. Found: C, 16.35; H, 3.81; N, 9.40; F, 25.8.

EXAMPLE IV

*Preparation of difluoramine adduct of 3-hydroxy-3-methylbutanone-2:2-difluoramino-3-methylbutane-2,3-diol*

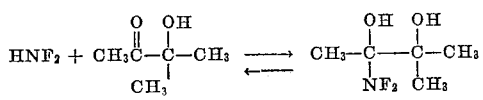

3-hydroxy-3-methylbutanone-2 (0.8 g., 7.85 m. moles) was placed in a vacuum line U-tube, degassed and 206 cc. STP (9.2 m. moles) of difluoramine (99% purity by mass spectrometric analysis) was condensed into the same U-tube using a methylcyclohexane (—128° C.) slush bath. When the U-tube contents reached room temperature, the pressure of the system was 295 mm.; when cooled to 0° C. the pressure dropped rapidly to 173 mm. The expected pressures in this system would be:

For no reaction—well over 760 mm.
For complete reaction—210 mm.

Thus, at room temperature, the addition reaction was substantially complete; at 0° some of the excess difluoramine was dissolved in the liquid adduct.

The reaction mixture was cooled to —80°, volatile material was removed under vacuum and the residue was distilled into an adjoining U-tube cooled to —80°. Product which was retained at —80° showed a vapor pressure of 34 mm. at 24° (this is due to partial dissociation). This product was condensed into an N.M.R. tube and sealed under vacuum. F$^{19}$ resonance absorption: Singlet at —3993 cps. vs. TFA. H$^1$ resonance absorption showed one OH-type proton absorption band (41 cps. referred to benzene) and methyl group bands. The intensity ratio of these bands was approximately 6:3:2, as expected for six equivalent hydrogens (on two indistinguishable OH groups).

The infrared spectrum showed both OH- and carbonyl bands, indicating that the sample was partially dissociated.

Note: Infrared measurements were made on samples opened to the atmosphere where dissociation would be expected to take place; N.M.R. measurements were made on sealed samples where dissociation is held to a minimum. Elementary analyses were not made since extensive dissociation would be unavoidable during weighing and manipulation.

EXAMPLE V

*Preparation of difluoramine adduct of acetone: 2-difluoraminopropanol-2*

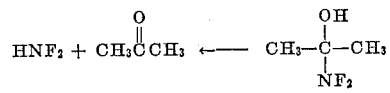

Acetone and difluoramine were condensed together in an evacuated U-tube using a stoichiometric excess of HNF$_2$ over the quantity of acetone such that when the mixture warmed to 0° C., the pressure of the system was less than one atmosphere. The mixture was allowed to stand at 0° for several hours, during which time a gradual pressure decrease was observed. The mixture was then cooled to —80° and distilled into an adjoining evacuated U-tube cooled to —80°, volatile material (excess HNF$_2$) passing into a second evacuated U-tube cooled to —128°. Material retained in the —80° receiver was a white, crystalline solid, which melted at approximately +9° C. and showed a vapor pressure of 51 mm. at its melting point. On melting an abrupt pressure increase was observed, indicating dissociation into acetone and HNF$_2$. Prolonged cooling was required to restore the undissociated solid. F$^{19}$ resonance absorption: singlet at —3920 cps. vs. TFA (sl. dissociation of HNF$_2$ gave weak pip at —2860 cps. vs. TFA). H$^1$ resonance absorption showed an OH-type proton absorption band (65 cps. referred to benzene) and methyl group bands at 192 cps. (free acetone) and 220 cps. due to the adduct.

The infrared spectrum of the adduct showed both —OH and carbonyl bands, indicating the presence of dissociated acetone.

EXAMPLE VI

*Reaction of butyraldehyde and difluoramine*

Into an evacuated 50 ml. flask containing 1.2 grams (0.017 mole) of freshly distilled butyraldehyde was condensed by means of a methylcyclohexane slush bath, 513 cc. (STP 0.023 mole) of difluoramine, HNF$_2$. The slush bath was replaced by a Dry Ice-acetone bath, and the reaction mixture allowed to stand for one hour. Excess HNF$_2$ (125 cc., STP) was pumped off of the reaction mixture. The residual liquid product was distilled at reduced pressure, B.P. 41°/40 mm., and its identity established as n-difluoraminobutanol by its infrared, proton and fluorine resonance spectra.

EXAMPLE VII

Equimolar quantities of solid paraformaldehyde and difluoramine in an evacuated bulb react slowly at room temperature with the formation difluoraminomethanol. When the initial pressure of difluoramine is one-half atmosphere, the reaction is complete in 3–6 hours. The yield of difluoraminomethanol is greater than 90%.

EXAMPLE VIII

Into a 400 ml. evacuated bulb containing 0.44 g. (0.0035 mole) paraldehyde was condensed 290 ml. (S. T. P.) (0.013 mole) difluoramine. After standing 12 hours at room temperature the pressure dropped from 300 to 90 mm. The product was collected by vacuum fractionation through −80° and −13° traps. The yield of difluoraminoethanol which was collected in the −80° trap was greater than 90%.

We claim:
1. A process for the preparation of carbinols containing the difluoramino group which comprises reacting difluoramine, $HNF_2$, with carbonyl-containing compounds selected from the group consisting of (a) compounds of the formula $RCOR^1$ in which R is selected from the group consisting of H and lower alkyl containing 1 to 4 carbon atoms and $R^1$ is selected from the group consisting of H and lower alkyl containing 1 to 4 carbon atoms, and (b) compounds of the formula $R^2COR^2$ in which $R^2$ is selected from the group consisting of $COOCH_3$ and $COOC_2H_5$, and (c) compounds of the formula $CH_3COR^3$ in which $R^3$ is hydroxyalkyl containing 2 carbon atoms and recovering the difluoramino carbinols so formed.
2. A process as set forth in claim 1 in which the molar ratios of $HNF_2$ to carbonyl-containing compound are from 1.5 to 1 to 1 to 1.5.
3. A process as set forth in claim 1 in which the molar ratio of $HNF_2$ to carbonyl-containing compound is from 1 to 1.
4. A process as set forth in claim 1 in which the reaction temperature is from 0° C. to 150° C.
5. A process as set forth in claim 1 in which the reaction temperature is from 25° C. to 150° C.
6. A carbinol selected from the group consisting of (a) compounds of the formula

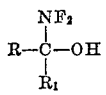

in which R is selected from the group consisting of H and lower alkyl containing 1 to 4 carbon atoms and $R^1$ is selected from the group consisting of H and lower alkyl containing 1 to 4 carbon atoms, and (b) compounds of the formula

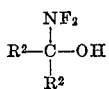

in which $R^2$ is selected from the group consisting of $COOCH_3$ and $COOC_2H_5$, and (c) compounds of the formula

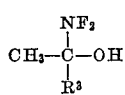

in which $R^3$ is hydroxyalkyl containing 2 carbon atoms.
7. α-Difluoraminomethanol.
8. α-Difluoraminoethanol.
9. α-Difluoraminobutanol.
10. 2-difluoramino-2,3-dihydroxybutane.
11. Diethyl α-difluoramino-α-hydroxymalonate.

No references cited.

LORRAINE A. WEINBERGER, *Primary Examiner.*